United States Patent
Bookman et al.

(10) Patent No.: US 9,223,605 B2
(45) Date of Patent: Dec. 29, 2015

(54) VIRTUAL MACHINE ALLOCATION INTERNAL AND EXTERNAL TO PHYSICAL ENVIRONMENT

(75) Inventors: Peter Bookman, Sandy, UT (US); Chris R. Featherstone, South Jordan, UT (US); Harold C. Simonsen, Salt Lake City, UT (US)

(73) Assignee: V3 Systems Holdings, Inc., Draper, UT (US)

( * ) Notice: Subject to any disclaimer, the term of this patent is extended or adjusted under 35 U.S.C. 154(b) by 506 days.

(21) Appl. No.: 13/175,771

(22) Filed: Jul. 1, 2011

(65) Prior Publication Data

US 2013/0007735 A1    Jan. 3, 2013

(51) Int. Cl.
*G06F 9/455*    (2006.01)
*G06F 9/44*    (2006.01)

(52) U.S. Cl.
CPC .......... *G06F 9/45558* (2013.01); *G06F 9/4445* (2013.01); *G06F 2009/4557* (2013.01)

(58) Field of Classification Search
CPC .............. G06F 9/45533; G06F 9/5077; G06F 9/45537; G06F 9/45558; G06F 9/4445; G06F 2009/4557
See application file for complete search history.

(56) References Cited

U.S. PATENT DOCUMENTS

| | | | |
|---|---|---|---|
| 6,802,062 B1 * | 10/2004 | Oyamada et al. | 718/1 |
| 7,257,811 B2 * | 8/2007 | Hunt et al. | 718/1 |
| 7,484,208 B1 * | 1/2009 | Nelson | 718/1 |
| 7,512,769 B1 * | 3/2009 | Lowell et al. | 711/203 |
| 7,657,888 B2 | 2/2010 | Traut | |
| 7,680,919 B2 * | 3/2010 | Nelson | 709/223 |
| 7,784,053 B2 | 8/2010 | Casey | |
| 8,146,082 B2 | 3/2012 | Belay | |
| 8,260,904 B2 | 9/2012 | Nelson | |
| 8,280,974 B2 * | 10/2012 | Herington | 709/213 |
| 8,296,760 B2 | 10/2012 | Magenheimer | |
| 8,438,256 B2 * | 5/2013 | Rogel et al. | 709/223 |
| 8,489,699 B2 * | 7/2013 | Goggin et al. | 709/213 |
| 8,490,088 B2 * | 7/2013 | Tang | 718/1 |
| 2005/0120160 A1 | 6/2005 | Plouffe | |
| 2010/0125842 A1 | 5/2010 | Friedman | |
| 2010/0169537 A1 * | 7/2010 | Nelson | 711/6 |
| 2010/0250824 A1 * | 9/2010 | Belay | 711/6 |

* cited by examiner

*Primary Examiner* — Van Nguyen
(74) *Attorney, Agent, or Firm* — Miller, Matthias & Hull LLP

(57) ABSTRACT

Allocation of software and data support resources for a virtual machine between a physical support environment and an external location, and migration of a virtual machine between physical support environments. Prior to migration, the virtual machine operates on the first physical support environment using a resident portion of the support resources that is resident on the first physical support environment, and an external portion of the support resources that is not resident on the first physical support environment. The virtual machine is then migrated to a second physical support environment that either already has access to or at least has the capability of accessing a copy of the resident support resources. This migration may be accomplished by mapping a copy of the resident support resources on the second physical support environment to a copy of the external support resources. This allows migration without contemporaneously copying the external portion.

22 Claims, 11 Drawing Sheets

VIRTUAL MACHINE ALLOCATION INTERNAL AND EXTERNAL TO PHYSICAL ENVIRONMENT

BACKGROUND

For more than 40 years, technologists have known that one way to lower computing costs is to simultaneously share resources across multiple components and/or machines. This concept eventually led to the so-called file/server networking model where multiple desktop computers were linked together to a server where files and printer resources could be shared. Given the success achieved in improved performance and lowered costs through virtual servers, companies have been diligently attempting to replicate their efforts with "virtual desktops", which will now be explained.

As a user interfaces with a client computing system (hereinafter referred to as a "client"), the user is presented with a desktop environment. The desktop environment may include an intuitive visualization of various icons, windows, and other tools that that user may interact with to manipulate the various applications and environments offered by the desktop environment.

As events occur (such as user input), the desktop environment is processed in a manner that is appropriate given the event, resulting in perhaps some change to the state of the desktop environment. Conventionally, such desktop processing occurs on the client. However, desktop virtualization involves the offloading of the desktop processing to a location other the client (hereinafter referred to as a "centralized desktop location"), which location is perhaps even remote from the client. That offloaded location may be a server, a server cluster, or a server cloud.

The centralized desktop location maintains a virtual machine for each supported desktop environment. The virtual machine has access to all of the desktop state necessary to construct an image for how the desktop environment should appear. The virtual machine also manages the processing that serves up desktop images to the corresponding client, which are rendered by the client as they are received.

As the client interacts with the displayed desktop image, that client input is transmitted to the centralized desktop location. The corresponding virtual machine at the centralized desktop location interprets the client input, and processes the desktop. In response to this input, or in response to some other detected event, the virtual machine changes the state of the desktop if appropriate. If this changed state results in a change in how the desktop appears, the virtual machine constructs a different desktop image, and causes the centralized desktop location to transmit the altered desktop image to the client. From the user's perspective, this occurs often fast enough that the displayed desktop at the client is substantially immediately responsive to the user input at the client. The desktop as is exists on the centralized desktop location is often referred to as a "virtual desktop", and the application-level logic on the centralized desktop that is used to process the desktop is often referred to a "virtual machine".

Typically, the centralized desktop location may manage a number of virtual desktops for a corresponding number of clients. In some cases, the centralized desktop location may manage hundreds of virtual desktops. In some cases, the centralized desktop location is a physical machine, which is referred to herein as a "physical appliance". The physical appliance provides software and data support (hereinafter referred to as the "support resources") to the virtual machine (s). For instance, the operating system and certain applications may be provided by the physical appliance. Supporting data may also be included within the support resources. For instance, user data (such as persistent preference information) may also be stored by the physical appliance.

All of the software and data support resources are conventionally located on the physical machine itself. An alternative conventional solution occurs when an organization has multiple physical appliances. To provide backup, the organization will provide access to a storage area network (SAN) to multiple physical appliances, and store the software and data support resources on the SAN. If a failure were to occur with a physical appliance, the support resources are still available on the SAN from the other physical appliance. Thus, an instance of the physical machine may be constructed on the other physical appliance, and mapped to the corresponding software and data storage resources on the SAN, thereby effecting recovery.

BRIEF SUMMARY

At least one embodiment described herein relates to the allocation of software and data support resource for a virtual machine between a physical support environment (e.g., a physical appliance), and a location external to the physical support environment. While the principles are not dependent on which portions are allocated where, in one embodiment, resources that are more latency sensitive and/or are accessed more frequently are allocated on the physical support environment while resources that are less so, are allocated external to the physical support environment.

At least one embodiment described herein relates to the migration of a virtual machine between physical support environments. Prior to migration, the virtual machine operates on the first physical support environment using a portion (i.e., a first portion) of the support resources that is resident on the first physical support environment, and a second portion of the support resources that is not resident on the first physical support environment. The first portion of the support resources may be one or more distinct portions of the support resources, whereas the second portion of the support resources may likewise be one or more distinct portions of the support resources. The virtual machine is then migrated to a second physical support environment that either already has access to or at least has the capability of accessing a copy of the first portion of the support resources.

This migration may be accomplished by mapping a copy of the first portion of the support resources on the second physical support environment to a copy of the second portion of the support resources that is not resident on the second physical support environment. This allows a virtual machine instance on the second physical support environment that is able to access the copy of the first portion of the support resources on the second physical support environment to also access the copy of the second portion of the support resources. Thus, to complete migration, the first portion of the support resources did not need to be copied to the second physical support environment contemporaneous with the migration, since a copy of the first portion was already present on the second physical support environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with at least one embodiment described herein, software and data support resources (i.e., "soft" support resources or "soft" resources) for a virtual machine are allocated between a physical support environment and an external location. The physical support environment has a first portion (i.e., an internal portion) of the support resources (i.e., internal soft resources) and runs the virtual machine, whereas a second portion (i.e., an external portion) of the support resources (i.e., external soft resources) are not resident on the physical machine. For instance, resources which are more operational, may be sensitive to latency, and/or may be more frequently accessed during operation, are included as internal soft resources, In accordance with at least one embodiments described herein, the virtual machine is migrated from a first physical support environment (i.e., a source physical environment) to a second physical support environment (i.e., a target physical environment). The target physical support environment either already has present thereon a copy of the internal soft support resources or may access a copy of the internal soft support resources from a location external to the source physical environment as part of the migration.

First, some introductory discussion regarding computing systems will be described with respect to FIG. 1. Then, embodiments of the allocation of soft resources within and external to a physical support environment will be described with respect to FIGS. 2 through 4. Subsequently, embodiments of the migration of a virtual machine between physical support environments will be described with respect to FIGS. 5 through 8. In conclusion, a physical environment will be described with respect to FIGS. 9 through 12, in which a hypervisor that operates using one particular input/output interface (e.g., a block-based interface) uses an intermediation layer to interact with underlying storage that uses a different input/output interface (e.g., an object-based interface).

Figure 1:
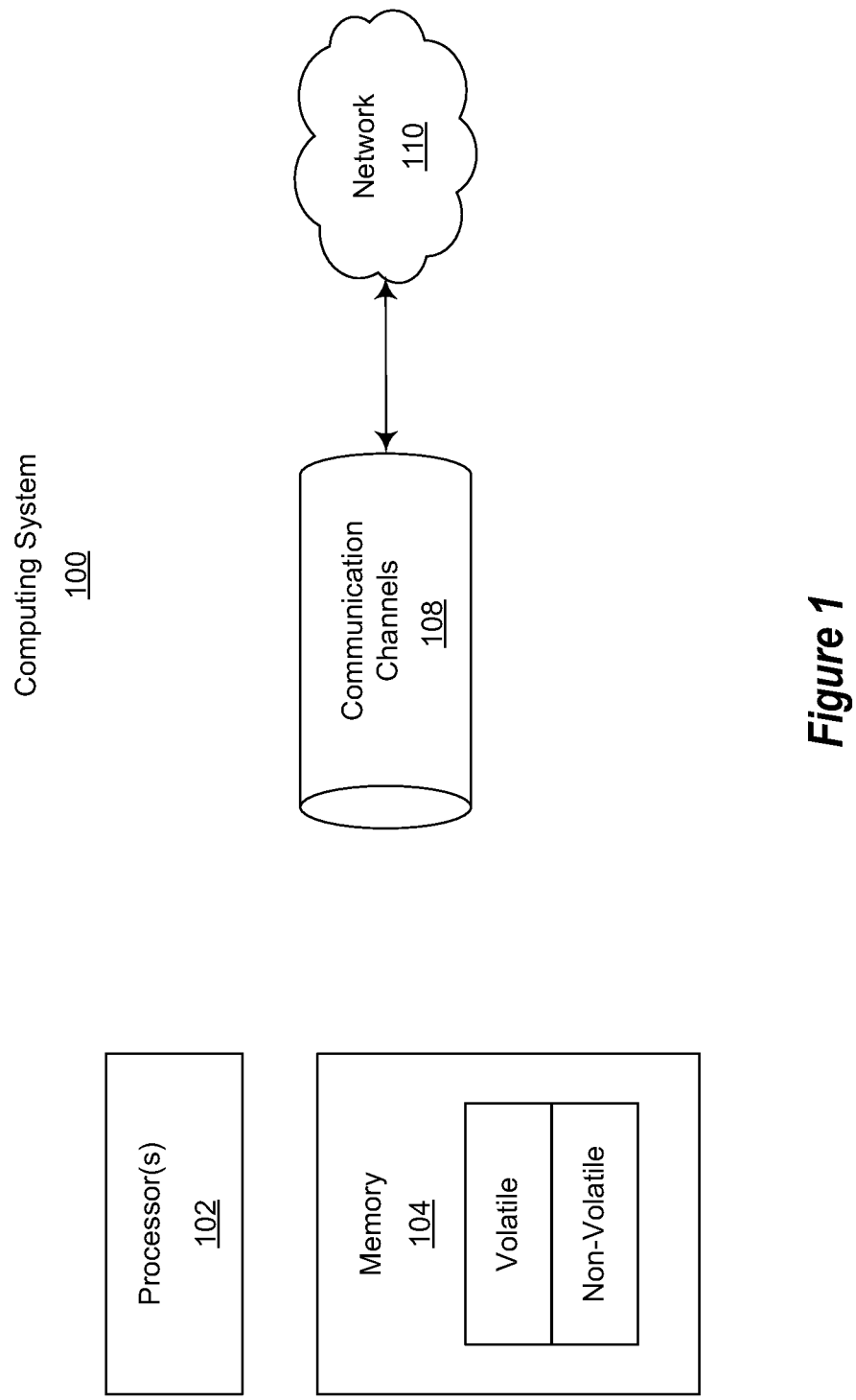
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
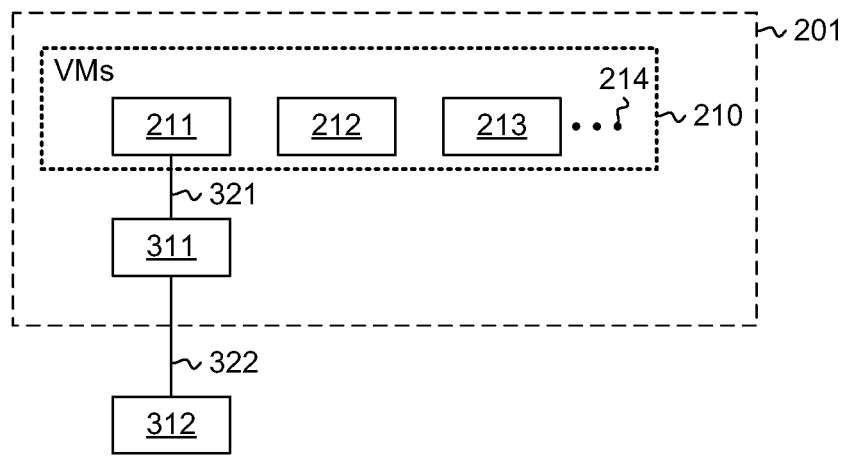
FIG. 2 illustrates a virtual machine environment that includes a single physical support environment supporting multiple virtual machines.

FIG. 2 illustrates a virtual machine operation environment 200. The operation environment includes a physical support environment 201 in which a set of virtual machines 210 operate. There may be any number of virtual machines 210 operating in the physical support environment 201. In FIG. 2, there are three virtual machines 211, 212 and 213 shown, with ellipses 214 representing that the number of virtual machines 210 may be as few as one, but potentially as many thousands, or even more. Thus, the physical support environment 201 may be a centralized location that manages many virtual machines. Each virtual machine manages state (e.g., a desktop state) for a corresponding client that may perhaps be remotely located. The virtual machine provides an image representing a desktop image to the corresponding client, and alters the image or other desktop state in response to detected events, such as, for example, a user interfacing with the current desktop image.

As the client interacts with the displayed desktop image corresponding to a virtual machine, that client input is transmitted to the centralized environment 201. The corresponding virtual machine interprets the client input, and processes the client input. In response to this input, or in response to some other detected event, the virtual machine changes the state of the virtual desktop if appropriate. If this changed state results in a change in how the desktop appears, the virtual machine constructs and transmits another desktop image to the client. From the user's perspective, this occurs often fast enough that the displayed desktop is substantially immediately responsive to the user input.

Each virtual machine needs resources in order to operate properly. The physical support environment 200 provides a variety of support resources for each of the virtual machines 210. For instance, some of that support includes hard (physical) support resources such as processing resources, memory resources, storage resources, network access resources, and the like. However, each virtual machine also uses soft support resources, such as software and data. As far as software, the virtual machine may use an operating system, one or more applications, and/or one or more other software modules. As far as data, the physical support environment 200 may host some or all of data that is used by the virtual machine in order to operate, such as user preference data, and other application state. The "soft" support resources are so named because the resources (such as software and data) are capable of being copied from one location to another, or accessed remotely over a network.

Figure 3:
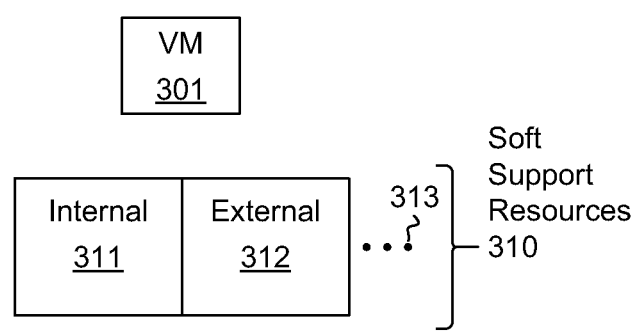
FIG. 3 illustrates a virtual machine in conjunction with internal and external soft support resources.

Referring to FIG. 3, an environment 300 is shown in which a virtual machine 301 is shown in conjunction with its soft support resources 310. The soft support resources 310 include a first portion 311, and a second portion 312. The ellipses 313 represent that there may be other portions of the soft support resources 310 as well. In accordance with the principles described herein, for each of at least some of the virtual machines operating in the physical support environment 201, a portion of the soft support resources are "internal" soft support resources in the sense that they are provided by the physical support environment 201, and a portion of the soft support resources are "external" in the sense that they are provided from a location that is external to the physical support environment.

For instance, referring to FIG. 2, the virtual machine 211 is illustrated as having a first soft support resource 311 that is internal to the physical support environment 201, and a second soft support resource 312 that is external to the physical support environment 201. In accordance with the embodiments described herein, the allocation of soft resources is made in a way that improves performance of the virtual machine, and which also allows for efficient migration of the virtual machine from one physical support environment to another.

Figure 4:
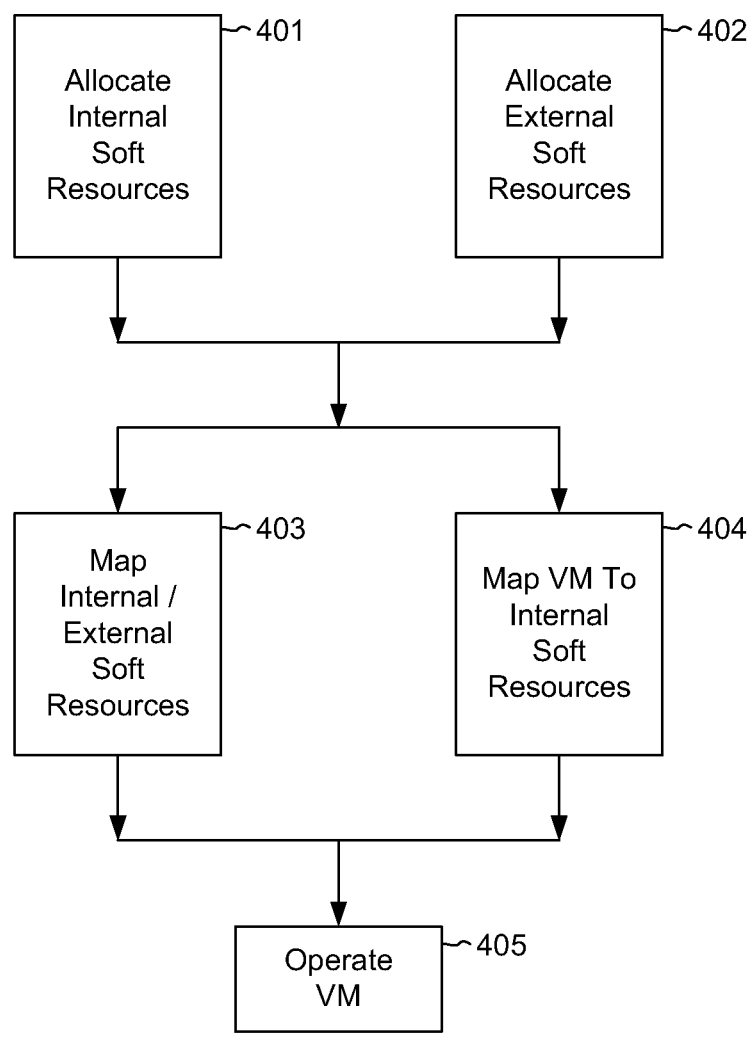
FIG. 4 illustrates a flowchart of a method for allocating software and data support resources for a virtual machine.

FIG. 4 illustrates a flowchart of a method 400 for allocating software and data support resources for a virtual machine. The method 400 of FIG. 4 will be described with frequent reference to the virtual machine operating environment 200 of FIG. 2. The method 400 includes allocating a first portion of the soft support resources on a physical support environment (act 401). For instance, in FIG. 2, soft support resource portion 311 is allocated internal to the physical support environment 201. This internal soft support resource portion 311 may actually include any number of distinct soft support resources. Thus, the act 401 may be performed for multiple internal soft support resource portions that may collectively be thought of as the internal soft support resource portion 311.

The method 400 also includes allocating a second portion of the support resources on a location external to the physical support environment (act 402). For instance, in FIG. 2, soft support resource portion 312 is allocated external to the physical support environment 201. This external soft support resource portion 312 may actually include any number of distinct soft support resources. Thus, the act 402 may be performed for multiple external soft support resource portions that may collectively be thought of as the external soft support resource portion 312. The acts 401 and 402 are shown in parallel to emphasize that there is no ordering dependence in terms of which of the internal or external soft support resources are allocated first, and/or whether they are wholly or partially allocated concurrently.

The principles described herein are not limited to the number of portions that are included in the internal soft support resource portion 311, nor to the number of portions that are included in the external soft support resource portion 312. As an example only, suppose that the soft support resources may be represented as a desktop image. In the VMDK (stands for Virtual Machine Disk) format, a desktop image may be split into three pieces. In that case, perhaps one or two of those pieces may be part of the internal soft support resource portion 311, and the remaining two or one (respectively) of those pieces may part of the external soft support resource portion 312. In another format offered by Unidesk Corporation, the desktop image may be divided into five pieces. In that case, one, two, three, or even four, of those pieces may be part of the internal soft support resource portion 311, and the remaining four, three, two or one (respectively) of those pieces may part of the external soft support resource portion 312.

These are, however, just examples, as the principles described herein may be applied to any case in which the desktop state is divided into at least N different pieces (where N is a positive integer that is two or greater), and where M of those pieces (where M is any positive integer less than N) are part of the internal soft support resource portion 311, and where N-M (read N minus M) of those pieces are part of the external soft support resource portion.

The internal and external soft support resources are then mapped to each other (act 403). For instance, referring to FIG. 2, this mapping is represented by mapping 322. This mapping 322 ensures that any virtual machine that has access to the internal soft resources 311 also has access to the external soft resources 312. Additionally, a virtual machine instance is mapped to the internal soft resources (act 404). Referring to FIG. 2, this mapping is represented by mapping 321. The acts 403 and 404 are shown in parallel to emphasize that there is no ordering dependence in terms of which of the mappings 321 or 322 occur first, and/or whether they are wholly or partially allocated concurrently.

With the internal and external soft resources properly allocated and mapped, the virtual machine may then be operated (act 405). For instance, referring to FIG. 2, the virtual machine 211 may operate using the internal soft resources 311 and the external resources 312. The virtual machines 212 and 213 may each also have allocated internal and external soft resources, although such soft resources are not shown in FIG. 2.

The method 400 may be performed by the physical support environment 201 using another virtual machine instance that is responsible for allocating soft resources externally and internally. In one embodiment, the physical support environment 201 is a physical machine (called herein a "physical appliance") that includes multiple processors, memory resource, storage resource (e.g., solid-state storage), network communication resource, and other resources that are shared across multiple virtual machines.

The allocation of which soft resources are to be internal and which are to be external to the physical support appliance may be made according to any criteria. In one embodiment, the criteria are selected carefully to promote faster operating times, and greater ease of migration should the virtual machine be migrated to another physical support environment.

In the case in which access latency is less when accessing internal soft resources as compared to external soft resources, the criteria may be that resources that are more operational, that may be accessed, on average, more frequently, are allocated as internal resources. On the other hand, soft resources that are less susceptible to latency are allocated externally. For instance, an operating system is a soft resource (e.g., a piece of software) which is frequently accessed during operation. Furthermore, certain applications may be frequently accessed. On the other hand, some user data may be less frequently accessed. For instance, user preference data may perhaps just be accessed once during rendering of a user interface corresponding to a particular virtual machine. Accordingly, even if there is a larger latency access such user preference data, that longer latency would not significantly impact the user experience at the client corresponding to the virtual machine.

Such an allocation may significantly improve operational performance. However, this improvement may be obtained in conjunction with improved efficiency in migration if the more common soft resources are made internal at multiple physical support environments. For instance, perhaps a subset of operating systems is made available at multiple physical support environments. If the internal soft resources are provisioned at both the source physical support environment, and the target physical support environment for a particular virtual machine migration, this reduces or even perhaps eliminates any copying needed to facilitate the migration. Accordingly, migration of a virtual machine may be made more efficiently, and even may appear seamless to the client user.

Figure 5:
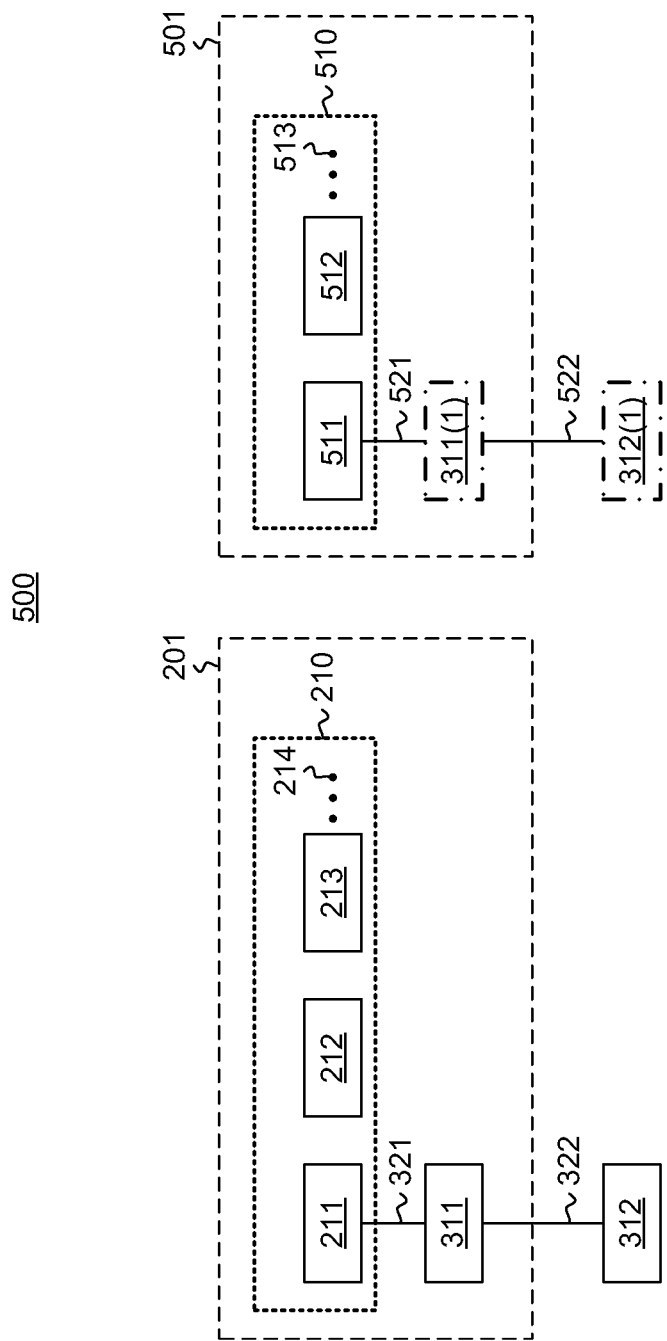
FIG. 5 illustrates a virtual machine environment in which a virtual machine may be migrated from a source physical support environment to a target physical support environment in accordance with a first class of embodiments in which a copy of the resident resources are already present on the second support environment even prior to migration.

FIG. 5 illustrates a virtual machine operating environment 500 that expands on the virtual machine operating environment 200 of FIG. 2 to show how the virtual machine 211 may be migrated from the physical support environment 201 (often referred to herein as a "source physical support environment" or simply "source environment") to another physical support environment 501 (often referred to herein as a "target physical support environment" or simply "target environment") in accordance with one class of embodiments. In this class of embodiments, even prior to migration, the target environment 501 already has a copy 311(1) of the internal soft resources 311 that the virtual machine 211 was using on the source environment 201. For instance, if the internal soft resource 311 were an operating system, that operating system would also be present on the target environment 501.

The target environment 501 also includes multiple virtual machines 510. In the case of FIG. 5, the target environment 501 includes two virtual machines 511 and 512, although the ellipses 513 represent that the target environment 501 may have running thereon many more virtual machines, and that the number of virtual machines may be dynamic. Each virtual machine 510 may perhaps be an application, just as is the case with respect to each of the virtual machines 210. The target environment 501 may be any system capable of supporting multiple virtual machines, and may perhaps be a physical appliance.

Figure 6:
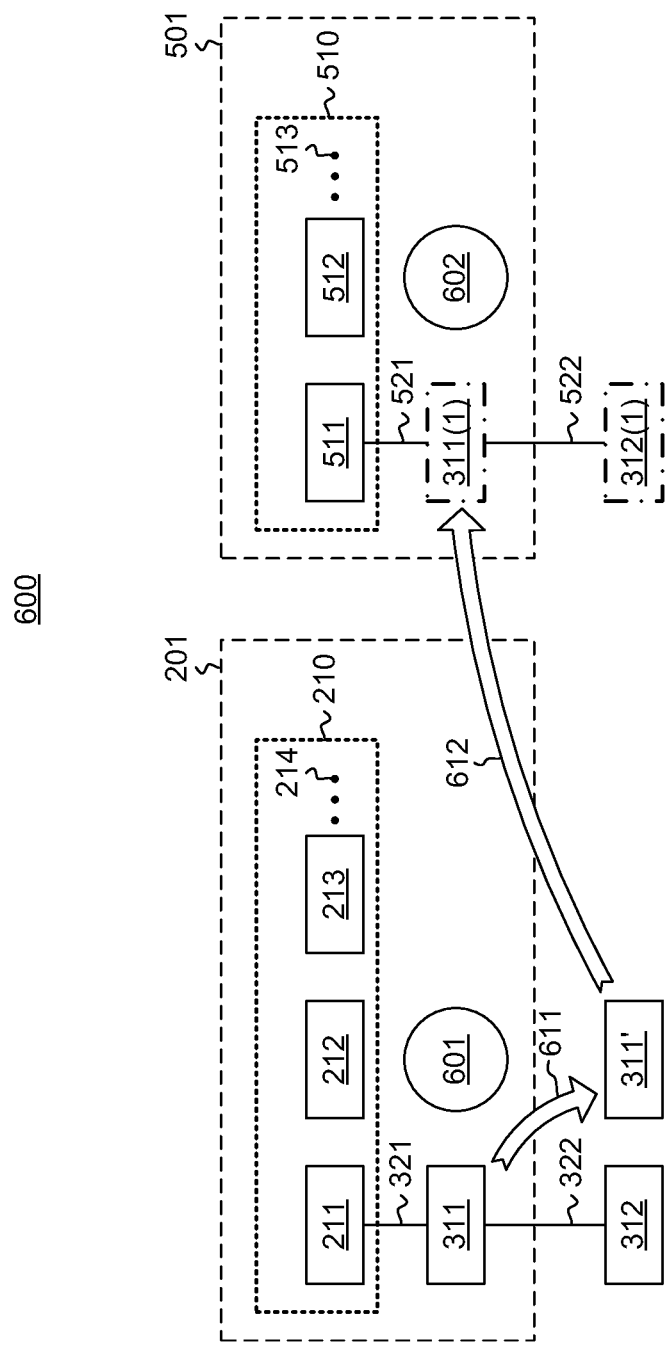
FIG. 6 illustrates a virtual machine environment in which a virtual machine may be migrated from a source physical support environment to a target physical support environment in accordance with a second class of embodiments in which the copy of the resident resources is obtained by the second support environment from a location external to the first support environment as part of the migration.

FIG. 6 illustrates a virtual machine operating environment 600 that expands on the virtual machine operating environment 200 of FIG. 2 to show how the virtual machine 211 may be migrated from the source physical support environment 201 to the target physical support environment 501 in accordance with a another class of embodiments. The virtual machine operating environment 600 of FIG. 6 is similar the virtual machine operating environment 500 of FIG. 5, except that in the class of embodiments represented by FIG. 6, the target environment 501 does not already have a copy 311(1) of the internal soft resources 311 prior to the migration. Instead, prior to migration, while the virtual machine 211 still operates on the source physical support environment 201, a checkpointing process 601 checkpoints a state of the internal soft resources 311 to form checkpointed state 311'.

This checkpointing is represented in FIG. 6 using arrow 611, and may be performed by one or more processes on the source physical support environment 201. The checkpoint state 311' in then a location (e.g., a network location) that is external to the source physical support environment and the target physical support environment. The checkpointed state 311' may be, for example, be a copy of the internal resources 311 as of a particular point of time. In one embodiment, multiple checkpointed states for the internal resources 311 may be maintained. As an example, a baseline checkpoint may be used with one or more delta checkpoints to calculate the final checkpoint. In one embodiment, the checkpointed state 311' has one or more components that are compressed, or perhaps is even entirely a compressed version of the internal resources, regardless of whether such compression is lossy or lossless. The utility of the checkpointed state 311' during migration in the embodiment of FIG. 6 will be described below with respect to FIGS. 7 and 8.

Figure 7:
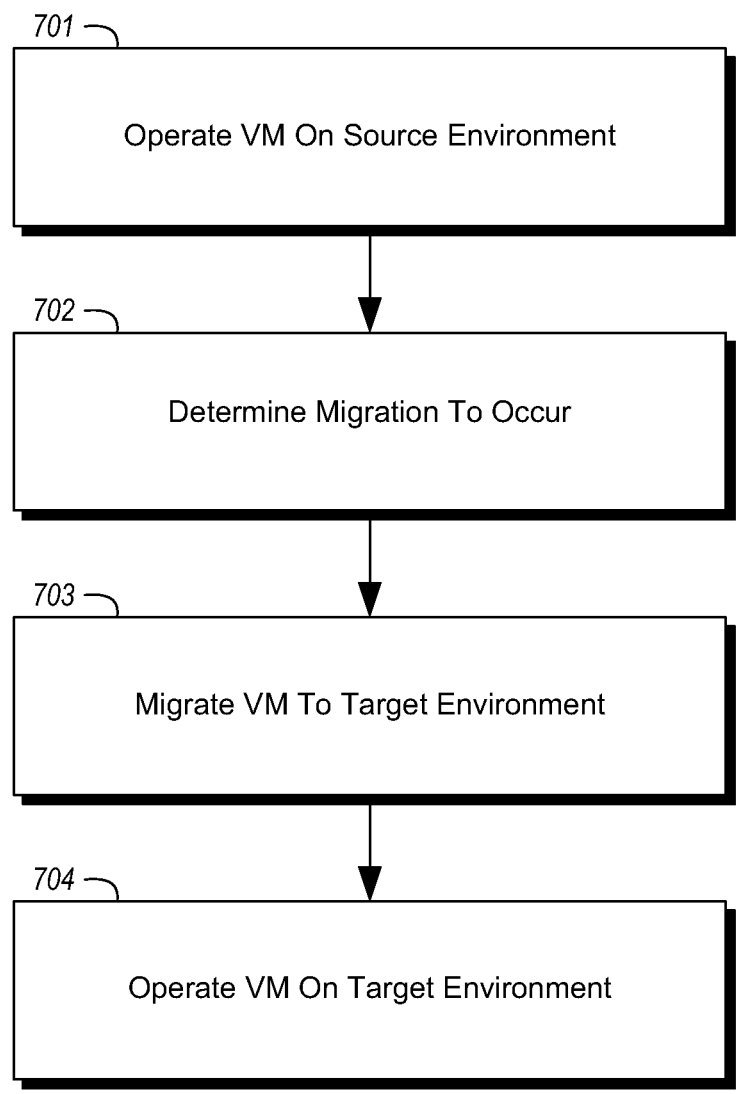
FIG. 7 illustrates a flowchart of the context of the migration of a virtual machine from the source environment to the target environment.

FIG. 7 illustrates a flowchart of the operational context 700 of the migration of a virtual machine from the source environment to the target environment, and will be described with reference to FIGS. 5 and 6.

Prior to migration, the virtual machine operates on the source environment (act 701). Referring to FIGS. 5 and 6, the virtual machine 211 uses the internal soft resources 311 and the external soft resources 312 in order to operate, as previously described using the mappings 321 and 322. In the embodiment of FIG. 5, during this operation, and even prior to migration, a copy 311(1) of the internal soft resources 311 is mirrored perhaps periodically on the target environment so that the target environment 501 may reflect such changes in the copy 311(1) present on the target environment 501. For instance, perhaps every 5 or 10 minutes, changes to the internal soft resources 311 on the source environment 201 may be transferred to the target environment 501. In the embodiment of FIG. 6, while the virtual machine is operating on the source environment (act 701), the internal soft resources 311 are occasionally backed up to the checkpointed state 311' that is maintained external to the source environment 201 and target environment 501.

At some point, it is determined that the virtual machine should migrate from the source environment (e.g., source environment 201 in FIGS. 5 and 6) to the target environment (e.g., target environment 501 in FIGS. 5 and 6) (act 702). This determination might be made by one of the source or target environments, or may be made external to such environments. There might be any reason for the migration. As examples, only, the source environment 201 may be no longer capable of operating the virtual machine. For instance, the source environment may be overloaded, or simply cease function altogether. The migration might also be in response to the execution of some load balancing to ensure that the source and target environments are load balanced.

In response to the determination, the virtual machine is migrated from the source environment to the target environment (act 703). Referring to FIGS. 5 and 6, the virtual machine 211 may be migrated from the source environment 201 to the target environment 501 in the form of virtual machine 511. In the embodiment of FIG. 5, the target environment 501 already has present thereon a copy 311(1) of the internal soft resources 311. However, in the embodiment of FIG. 6, the target environment 501 merely has the capability of accessing a copy 311(1) of the internal resources 311.

For instance, in FIG. 6, one or more processes (represented by process(es) 602) acquires (as represented by arrow 612) the checkpointed state 311'. This checkpointed state 311' may be the most recent checkpointed state generated by the checkpoint process(es) 601, although that certainly does not need to be so. The target environment 501 may then use that checkpointed state 311' to acquire the copy 311(1) of the internal resources 311. For instance, there may be some decryption and decompression of the checkpointed state 311', if the checkpointed state 311' were partially or fully encrypted and/or compressed. Furthermore, the checkpointed state 311' may have configuration information or other metadata that may affect how the copy 311(1) of the internal resources 311 is formulated on the target environment 501.

In the case of either environment of FIG. 5 or FIG. 6, once migration happens, the virtual machine operates on the target environment (act 704).

Figure 8:
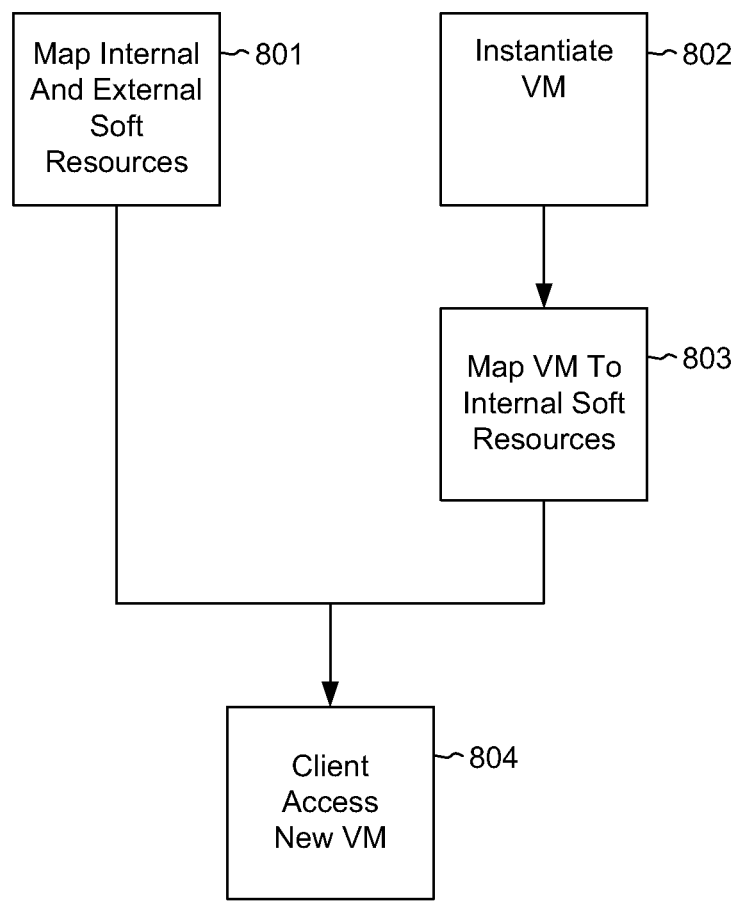
FIG. 8 illustrates a flowchart of a method from migrating a virtual machine from the source environment to a target environment.

FIG. 8 illustrates a flowchart of a method 800 from migrating a virtual machine from a source physical support environment to a target physical support environment. The method 800 is a specific example of the act 703 of FIG. 7. The method 800 will also be described with frequent reference to the environment 500 of FIG. 5 and the environment 600 of FIG. 6.

The copy 311(1) of the internal soft resource 311 (whether that copy was already present on the target environment prior to migration as is the case for FIG. 5, or was obtained after migration was initiated as is the case for FIG. 6) is mapped to a copy 312(1) of the external soft resource 312 (act 801). This mapping is represented by mapping 522 in FIGS. 5 and 6. The copy 312(1) may also be external to the target environment 501, and may, in some embodiments, be the same copy as the external soft resources 312 that are available to the source environment 201. For instance, the external soft resources 312 may be located in a Storage Area Network (SAN) available to both environments 201 and 501. Although not required, in the case of FIG. 6, the checkpointed state 311' may also be stored in the SAN. Otherwise, even if the copy 312(1) of the external soft resources 312 were not available to the target environment 501 prior to the migration, migration may involve copying only the external soft resources 312 from the location accessible to the source environment 201 to a location accessible to the target environment 501.

A virtual machine instance is mapped to the internal soft resource (act 803) if not mapped already. In FIGS. 5 and 6, for instance, virtual machine instance 511 is mapped to the copy 311(1) of the internal soft resource 311, as represented by mapping 521. This mapping 521 permits the virtual machine instance 511 to access the internal soft resources 311(1), and also permits the virtual machine instance 511 to use the mapping 522 to access the copy 312(1) of the external soft resource 312.

If the virtual machine instance 511 were not already instantiated prior to the mapping (act 803), then the virtual machine instance 511 is instantiated (act 802). At this point, the client may access the virtual machine 511 (act 804) and continue using all of the soft resources 310 including the internal soft resources 311 and the external soft resources 312, that was previously available to the virtual machine 211. Furthermore, this was accomplished without having to copy all of the external soft resources 311. Instead, the new virtual machine instance was given access to the external soft resources 312 through the target physical support environment 501.

In one or more embodiments, the copy 312(1) of the external resource 312 is the same copy as the external resource 312 that was accessed by the source physical support environment 201. For instance, to facilitate migration, a single copy of the external resource 312 may be on an external location that may be mapped to internal soft resources on either of the source and target physical support environments 201 and 501. In that case, copying the external resource 312 would not be necessary in order to facilitate migration. Instead, mere mapping would suffice.

However, in one or more embodiments, the external soft resource 312 is not available to the target environment 501 at the time of the migration. In that case, the external soft resources 312 would be copied from its source location external to the source environment 201 to a target location that is external to, but accessibly to, the target environment 501. However, even in this case, not all of the soft resources 310 were copied, just perhaps as little as the external soft resources 312 only. This improves the speed of migration, especially in cases in which the external soft resources 312 are much smaller than the internal soft resources 311.

The migration of the virtual machine 211 on the source environment 201 to the virtual machine 511 of the target environment 501 allows at least a core set of functionality (and perhaps all of the functionality) of the virtual machine to remain the same as far as a client experience is concerned. This is true because the virtual machine 511 has access to the same soft resources 310 after the migration, as the virtual machine 211 had access to prior to the migration. Note that migration does not necessarily mean that the virtual machine 211 is no longer operational after the migration. For instance, migration may involve simply copying virtual machine 211 to virtual machine 511 so that both instances have access to the same set of soft resources 310 to thereby retain similar or identical functionality. However, in some cases, the virtual machine 211 may cease operation and be released following migration, or even perhaps may cease to exist prior to migration (e.g., due to a physical failure of the source environment 201 to be able to continue to support the virtual machine instance 211).

Accordingly, a mechanism for efficiently migrating a virtual machine instance from a source physical support environment to a target physical support environment has been described. In one embodiment, the physical support environment on the source and/or target environments may be environments that permit for a set of virtual machines to interact with an underlying storage device through a hypervisor. The unique structure permits a file system of one type of I/O interface (e.g., a block-based interface) to interface with a storage system with a different interface (e.g., an object-based interface). Such an environment will be described with respect to FIGS. 9 through 12.

Figure 9:
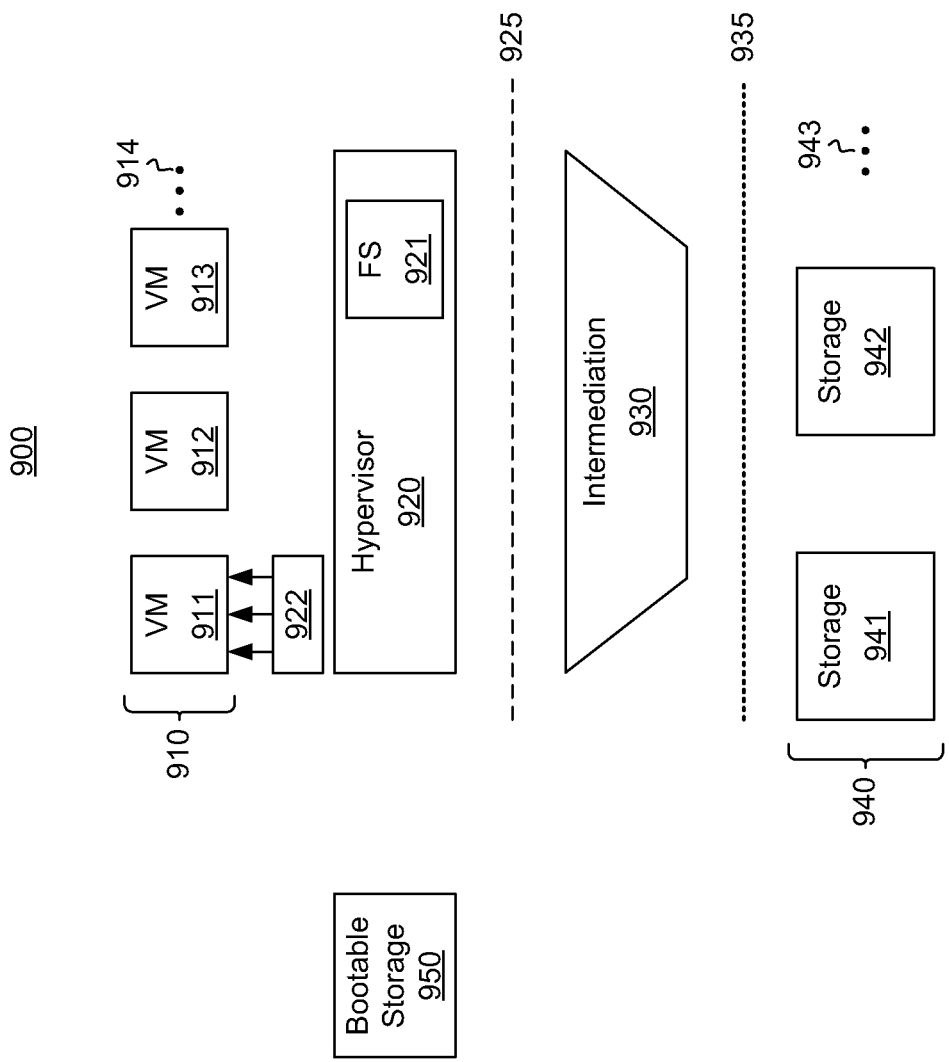
FIG. 9 illustrates an environment in which a plurality of virtual machines communicate through a hypervisor using an input/output interface that is converted to another input/output interface that is compatible with an underlying storage device.

FIG. 9 illustrates an environment 900 in which a set of virtual machines 910 interface indirectly with a set of underlying storage devices 940. For instance, the virtual machines 911, 912 and 913 of FIG. 9 may be the same virtual machines as the virtual machines 211, 212 and 213 of FIGS. 2, 5 and 6, in which case the environment 900 may be an example of the environment 201, although the environment 900 may alternatively or additionally represent the target environment 501 of FIGS. 5 and 6 as well. The ellipses 914 again represent flexibility in the number of virtual machine instances supported by the environment 900.

The virtual machines 910 interact with a hypervisor 920 that essentially services as the operating system for the virtual machines 910. The hypervisor 920 abstracts away the actual hardware of the environment 900 from the virtual machines 910. For instance, the hypervisor 920, amongst other functions, provides a file system 921 for the virtual machines.

The hypervisor file system 921 does not provide input/output requests in the format that is compatible with the interface 935 of the underlying storage devices 940. Rather, the hypervisor file system 921 provides input/output requests that are compatible with another interface 925. As an example, the hypervisor file system 921 may provide input/output requests in block format as it would if interfacing with a block-based storage device. File systems that interface with block-based storage devices are often referred to as block-based file systems. An example of a hypervisor file system that may perform block-based input/output requests is the File Allocation Table (FAT) and the New Technology File System (NTFS).

An intermediation component 930 converts input/output requests that are compatible with the interface 925 into input/output requests that are compatible with the interface 935 so that the requested data access may be accomplished with the underlying data storage devices. In one embodiment, the interface 935 is an object-based interface and the underlying storage devices 940 are object-based storage devices. In that case, an example of the interface 935 might be the ANSI T10 SCSI OSD standard, although the principles described herein are not limited to the interface 935 being that standard, nor limited to the interface 935 even being an object-based interface at all. Intermediation components that convert between block-based interfaces and object-based interfaces are commercially available. The intermediation component 230 may include firmware and/or software that allows it to perform the intermediation.

Object-based storage devices (sometimes referred to in the art as an "OSD") contain data structures called "objects" that are variable-sized data-storage containers. Each object includes data and properties. The data is consumable by the entity (e.g., the application) requesting the objects. The properties include an object identifier, attributes, and metadata. The object-based storage device provides its own mechanism for allocating and placement of storage for the objects, rather than rely on a file system. Furthermore, the object-based storage device does not use a memory-intensive index to track objects. Rather than being a flat list of fixed-sized memory locations as is the case with block-based storage, the objects in an object-based storage device may be any size, and may be interrelated, and perhaps hierarchically structured, with related objects perhaps being distributed across multiple object-based storage devices. Such distributed object hierarchies are enabled by keeping the metadata for each object local to the application that accesses the hierarchy, while allowing the data itself to be distributed.

In the illustration of FIG. 9, the storage devices 940 include two storage devices 941 and 942. However, the ellipses 943 represent that there may be any number of storage devices that may be accessed through the interface 935. In fact, if the interface 935 were an object-based interface that permitted the underlying storage devices 940 to contain distributed objects, the underlying storage devices 941 may likewise be distributed. The embodiments described herein are not limited to the physical structure of the storage devices 940. For instance, the storage devices may include disk storage, solid-state storage or any other mechanism for storing data. Solid-state storage, however, allows rapid data access speeds.

The environment 900 also includes a bootable storage device 950. In one embodiment, the virtual machines 910, the hypervisor 920 and the intermediation component 930 reside on a single server machine, with perhaps one or more or all of the storage devices 940 also being located on that same server machine, or at least within a common trusted cluster of servers.

The bootable storage device 950 contains low-level executable code that is automatically executed upon powering up the server machine. Upon completion of execution of the bootable code, the hypervisor 920 and intermediation component 930 (which may be software programs) are executed. Subsequently, as each virtual machine is instantiated, the virtual machine may use the hypervisor 920 to provide access to bootable code. The bootable storage device 950 may be accessed through a network, but is preferably a storage device that is available locally on the server machine.

In some embodiments, the storage devices may have their own processing capability and export callable functions. For instance, conventional commercially available object-based storage often exports particular functions that may be called by software components. Example of such functions includes status functions that permit certain current status of the storage device to be queried. For instance, the storage device may be queried to verify which virtual machine is currently writing to and/or reading from the storage device. Another example of a function might be for the object-based storage device to emulate a conventional block-based disk using RAID (which originally was an acronym for Redundent Array of Inexpensive Disks) technology. Again, each model of storage device may offer a set of functions, some or all of which being unique to that model.

However, to call such particular functions often requires administrator rights. To allow for scaling such that a large number of virtual machines can operate in the environment 900, a few, and preferably only one, of the virtual machines is provided with administrator rights, and is loaded with an agent framework 922 that operates to place function calls directly into the storage device. For instance, VMWare currently offers a product in which a root virtual machine (as an example, virtual machine 911) may be provided with administrative rights. The agent framework 922 may be loaded into the root virtual machine 911 to thereby allow the root virtual machine 911 access to the model-specific storage device functions.

For instance, as a first method example, the agent framework 922 may be configured to query the storage device (e.g., an object-based storage device) for status information using functions offered by the corresponding storage device. As an example, the agent framework may query as to how much data is being written to and/or read from the storage device in a given time period, the current temperature of the storage device, what the current performance parameters are of the storage device, and so forth.

As a second method example, the agent framework 922 may also format the storage device using storage-specific functions. For instance, depending on the intended usage of the storage device, the storage device may be formatted with certain block sizes.

As a third method example, the agent framework 922 may provide firmware updates to the storage device again using storage-specific firmware upgrade functions.

As a fourth method example, the agent framework 922 may be used to get the physical erase block map for the storage device. This may be used to determine whether a storage device has any bad sectors, for example.

As a fifth method example, the agent framework 922 may be used to get the logical erase block map for the storage device.

The methods offered by the agent framework 922 may depend on the specific functionality offered by the underlying storage device. Thus, as the environment 900 is expanded to include additional models of storage devices, the agent framework 922 may also have additional methods that take advantage of the extended functionality of those new models of storage devices.

The agent framework 922 may also report to management logic (e.g., a connection broker) regarding particular parameters of the environment 900 as described with respect to FIG. 12 below, after the description of the operation of the environment 900 with respect to FIGS. 10 and 11.

Figure 10:
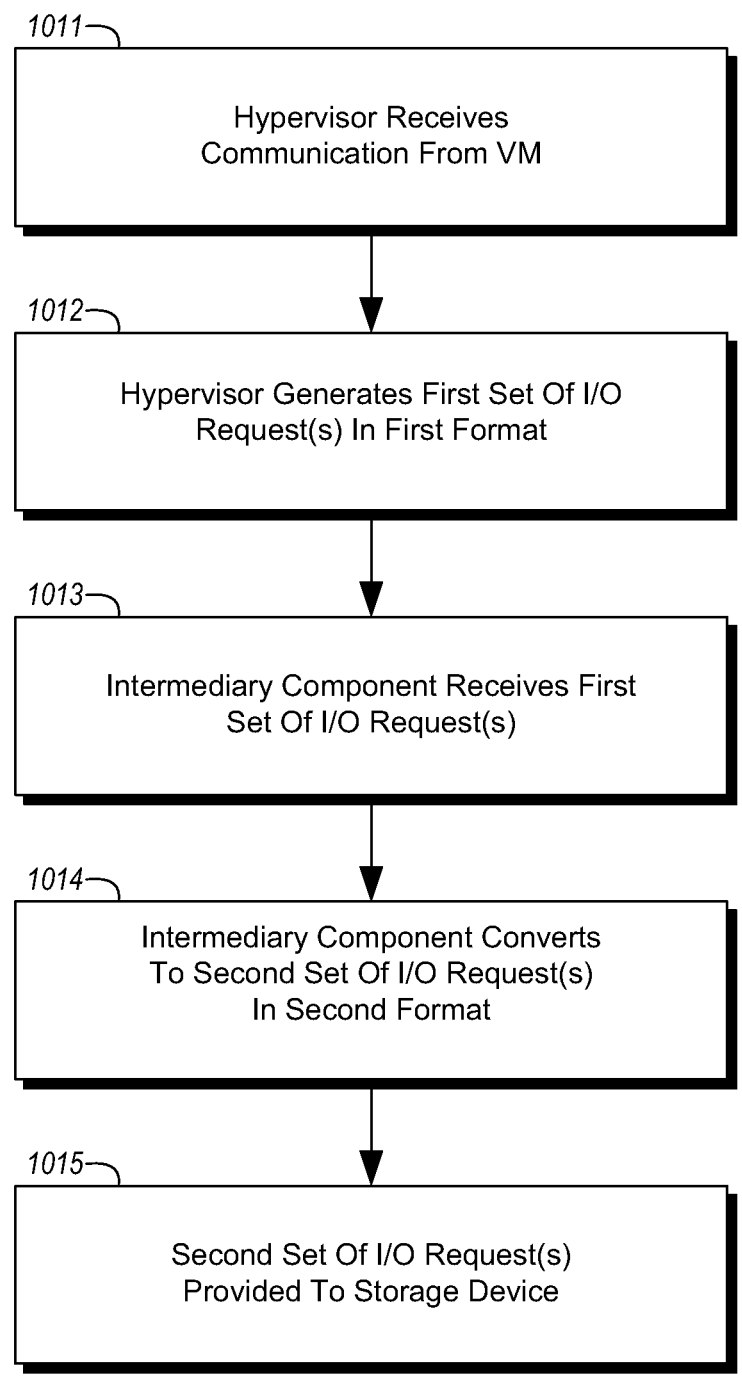
FIG. 10 illustrates a flowchart of a method for one of the virtual machines to submit an input/output request to the underlying data storage device through an abstracting hypervisor in the environment of FIG. 9.

FIG. 10 illustrates a flowchart of a method 1000 for the virtual machine(s) 910 to write to the storage device(s) 940. The hypervisor receives a file access request or other communication from one or the virtual machines 910 (say virtual machine 911) that operates using a file-based operating system (act 1011). The hypervisor file system 921 then converts the file access request into the first set of one or more input/output requests in a first format (act 1012). As an example, the first format may be block-based input/output requests in which block-based requests are provided through the interface 925 to the intermediation component 930.

The intermediation component 930 receives these input/output request(s) (act 1013) and converts them into a second set of one or more input/output requests that are that is compatible with an underlying storage device (act 1014). For instance, the intermediation component 930 of FIG. 10 converts the block-level input/output requests that are compatible with block-based storage devices into object-based input/output requests that are compatible with underlying object-based storage devices. The intermediation component 930 then causes the second set of input/output request(s) to be provided through the interface 935 to the appropriate underlying storage device (act 1015).

Figure 11:
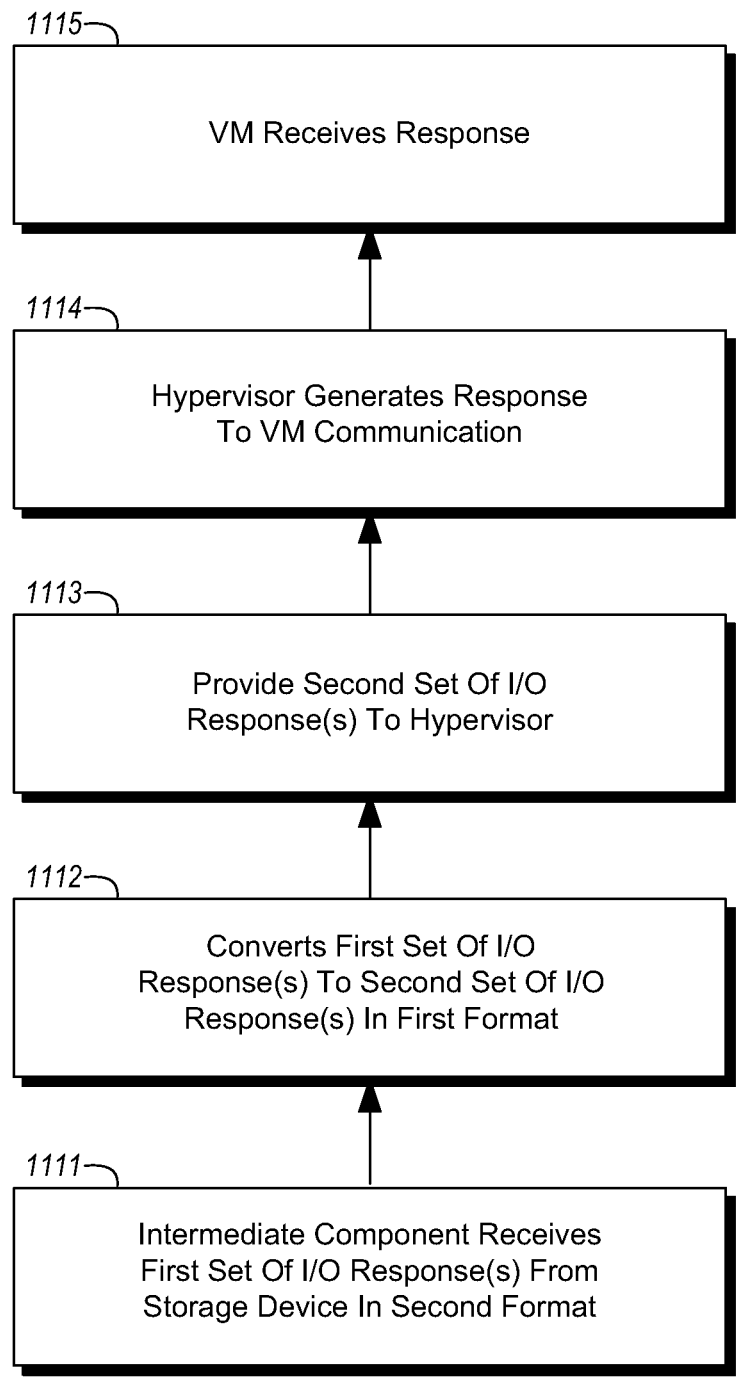
FIG. 11 illustrates a flowchart of a method for a resulting read from the underlying storage device to be provided to the virtual machine through the abstracting hypervisor.

FIG. 11 illustrates a flowchart of a method 1100 for the storage device 940 to read to the virtual machine 910. Here, the process essentially is the reverse of that in FIG. 10, and is illustrated in FIG. 11 leading from the bottom to the top of the figure. The intermediary component receives a first set of one or more input/output response(s) from the underlying storage device (act 1111). For instance, these responses may be in response to the second set of input/output request(s) made through the interface 935 by the intermediary component 930 to the storage device 941. The first set of input/output responses is likewise provided through the interface 935. As an example, again, the first set of input/output response(s) may be compatible with an object-based interface.

The intermediary component 930 converts the first set of input/output response(s) in the second format to a second set of one or more input/output response(s) in the first format (at 1112). In the specific block/object example, the first format may be a block format, and may be similar to the response that would be received from a block-based storage device. In that case, the second set of one or more input/output response(s) may be block-based responses.

The second set of one or more input/output response(s) are then provided by the intermediary component 930 to the hypervisor 920 through the interface 925 (act 1113). The file system 921 then converts the second set of one or more input/output response(s) (e.g., the read blocks) into a file access response (act 1114) (i.e., the actual file requested by the virtual machine 911). The file access response is then provided to the virtual machine (act 1115).

Figure 12:
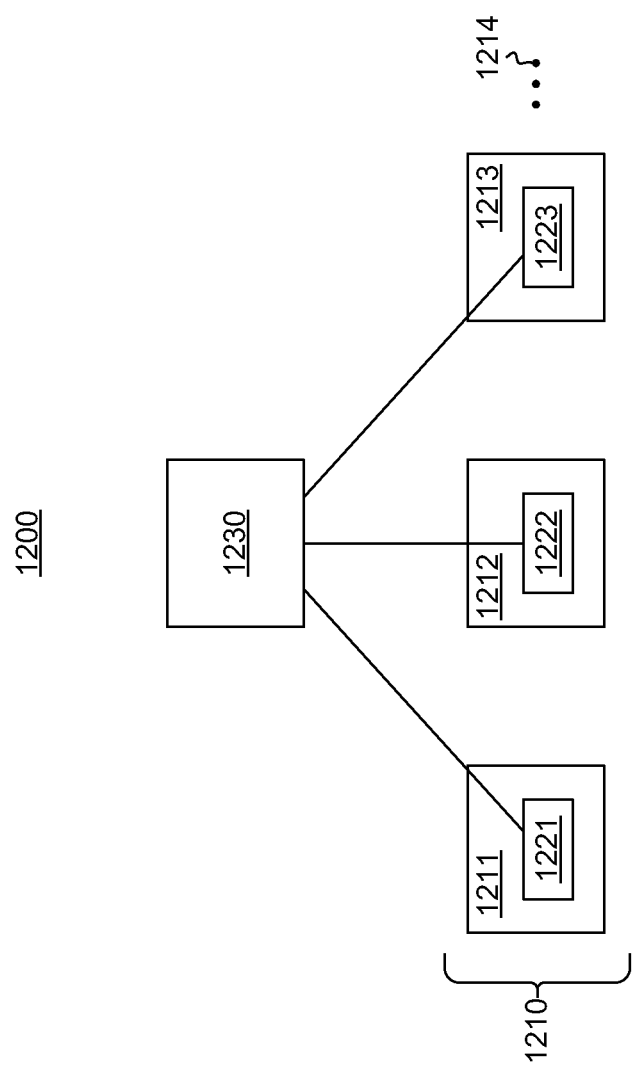
FIG. 12 illustrates a network environment that includes multiple instances of the environment of FIG. 9 that are all served by a connection broker.

FIG. 12 illustrates a network environment 1200 that includes multiple instances 1210 of the environment 900 of FIG. 9. In FIG. 12, there are three instances 1211, 1212 and 1213 of the environment of FIG. 9, although the ellipses 1214 represent that there may be more of such environments. Each instance 1210 is represented abstractly in that only the agent framework is shown for each instance 1210, though each instance may indeed be structured as illustrated and described with respect to FIG. 9. In FIG. 12, the agent framework 1221 is running on the environment 1211, agent framework 1222 is running on the environment 1212, agent framework 1223 is running on the environment 1213, and so forth. Each agent framework may perform the functions described for the agent framework 922 of FIG. 9. In one embodiment, each of the environments 1210 may be a single physical host. In that case, there may be one agent framework running on each host.

As previously mentioned, the agent framework may perform management functions for the corresponding host. For instance, the agent framework may report to a management component 1230 regarding performance parameters of the corresponding host. The management component 1230 may monitor the performance for multiple hosts, and perform load balancing accordingly. For instance, the management component 1230 may include connection broker functionality that connects each connection request from a client to a corresponding host, or in particular, perhaps to a corresponding virtual machine.

Embodiments described herein thus also permit a mechanism for a file system that communicates using one data access model with an underlying storage device that communicates using a different data access model. In one example, the file system may be a file system that does not follow an object-based data access model, which using the principles described herein, may now utilize an object-based data model. In a specific example, virtual machines operating a block-based file system may now access an object-based storage device using the principles described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for migrating a virtual machine from a first physical support environment to a second physical support environment, the virtual machine using software and data support resources in order to operate, the method comprising:
   an act of operating the virtual machine on the first physical support environment using a first portion of the support resources that is resident on the first physical support environment, and a second portion of the support resources that is not resident on the first physical support environment;
   an act of migrating the virtual machine to the second physical support environment that either already has access to or at least has the capability of accessing a copy of the first portion of the support resources, the act of migrating comprising:
      an act of mapping a copy of the first portion of the support resources on the second physical support environment to a copy of the second portion of the support resources that is not resident on the second physical support environment, such that a virtual machine instance on the second physical support environment that is able to access the copy of the first portion of the support resources on the second physical support environment is also capable of accessing the copy of the second portion of the support resources; and
      an act of accessing the virtual machine instance on the second physical support environment; and
   an act of operating the virtual machine on the second physical support environment using the copy of the first portion of the support resources that is resident on the second physical support environment, and the mapped copy of the second portion of the support resources that is not resident on the second physical support environment.

2. The method in accordance with claim 1, wherein the copy of the first portion of the support resources is already present on the second physical support environment before the act of migrating.

3. The method in accordance with claim 1, wherein the copy of the first portion of the support resources is not already present on the second physical supporting environment before the act of migrating.

4. The method in accordance with claim 3, wherein the act operating the virtual machine on the first physical support environment, further comprises the following before the act of migrating: an act of checkpointing in a current state of the first portion of the support resources to a network location other than the first physical support environment and the second physical support environment.

5. The method in accordance with claim 4, wherein the act of migrating further comprises: an act of obtaining the checkpointed state of the first portion of the support resources from the network location such that the copy of the first portion of the support resources is made available at the second physical support environment.

6. The method in accordance with claim 1, wherein the first portion of the support resources includes an operating system.

7. The method in accordance with claim 6, wherein the second portion of the support resources includes user data.

8. The method in accordance with claim 1, wherein the first portion of the support resources includes resources that are, on average, accessed more frequently than resources included in the second portion of the support resources.

9. The method in accordance with claim 1, wherein the first portion of the support resources includes resources that are, on average, more sensitive to latency than resources included in the second portion of the support resources.

10. The method in accordance with claim 1, wherein the copy of the second portion of the support resources that is mapped in the act of mapping is the same copy as the second portion of the support resources that is used to operate the virtual machine on the first physical support environment.

11. The method in accordance with claim 1, wherein the second portion of the resources is stored in a storage area network that was accessible to the first physical support environment at least at the time of the act of operating, and that is also accessible to the second physical support environment at least at the time of the act of migrating.

12. The method in accordance with claim 1, wherein the copy of the second portion of the support resources that is mapped in the act of mapping is a different copy than the second portion of the support resources that is used to operate the virtual machine on the first physical support environment.

13. The method in accordance with claim 12, wherein the act of migrating further comprises: an act of copying the second portion of the support resources from a first location that was accessible to the first physical support environment at the time of the act of operating to a second location that is accessible to the second physical support environment at the time of the act of mapping.

14. The method in accordance with claim 1, wherein the first physical support environment is a physical appliance.

15. The method in accordance with claim 14, wherein the physical appliance is a first physical appliance, and wherein the second physical support environment is a second physical appliance.

16. The method in accordance with claim 1, wherein the second physical support environment is a physical appliance.

17. The method in accordance with claim 1, wherein the act of migrating comprises: an act of moving the virtual machine from the first physical support environment to the second physical support environment.

18. The method in accordance with claim 1, wherein the act of migrating comprises: an act of copying the virtual machine from the first physical support environment to the second physical support environment.

19. The method in accordance with claim 1, further comprising the following after the act of operating, but before the act of migrating: an act of detecting that the first physical support environment is no longer capable of operating the virtual machine.

20. The method in accordance with claim 1, further comprising the following after the act of operating, but before the act of migrating: an act of determining that the second physical support environment should operate the virtual machine instead of the first physical support environment.

21. The method in accordance with claim 1, wherein the first portion of the support resources comprises a plurality of pieces of a desktop image.

22. The method in accordance with claim 20, wherein the second portion of the support resources comprises a plurality of pieces of a desktop image.

\* \* \* \* \*